(12) United States Patent
Hochstetter et al.

(10) Patent No.: US 8,883,898 B2
(45) Date of Patent: Nov. 11, 2014

(54) METHOD FOR IMPREGNATING CONTINUOUS FIBRES WITH A COMPOSITE POLYMER MATRIX CONTAINING A GRAFTED FLUORINATED POLYMER

(75) Inventors: Gilles Hochstetter, Bernay (FR); Michael Werth, Bernay (FR)

(73) Assignee: Arkema France, Colombes (FR)

( * ) Notice: Subject to any disclaimer, the term of this patent is extended or adjusted under 35 U.S.C. 154(b) by 520 days.

(21) Appl. No.: 12/666,678

(22) PCT Filed: Jun. 27, 2008

(86) PCT No.: PCT/FR2008/051186
§ 371 (c)(1),
(2), (4) Date: Dec. 24, 2009

(87) PCT Pub. No.: WO2009/007616
PCT Pub. Date: Jan. 15, 2009

(65) Prior Publication Data
US 2011/0166278 A1  Jul. 7, 2011

(30) Foreign Application Priority Data
Jun. 27, 2007  (FR) ..................................... 07 04617

(51) Int. Cl.
*D06M 23/10*  (2006.01)

(52) U.S. Cl.
USPC .......................................... 524/404; 977/742

(58) Field of Classification Search
USPC .......................................... 524/404; 977/742
See application file for complete search history.

(56) References Cited

U.S. PATENT DOCUMENTS

| | | | |
|---|---|---|---|
| 5,614,309 A * | 3/1997 | Chung et al. | 428/375 |
| 6,998,434 B2 * | 2/2006 | Wadahara et al. | 524/495 |
| 7,479,516 B2 * | 1/2009 | Chen et al. | 524/495 |
| 7,988,860 B2 * | 8/2011 | Kalayci et al. | 210/679 |
| 2003/0170538 A1 * | 9/2003 | Miyaki et al. | 429/217 |
| 2005/0069778 A1 * | 3/2005 | Bonnet et al. | 429/246 |
| 2006/0292360 A1 * | 12/2006 | Hays et al. | 428/323 |
| 2008/0149561 A1 * | 6/2008 | Chu et al. | 210/500.38 |

* cited by examiner

Primary Examiner — Peter D. Mulcahy
(74) Attorney, Agent, or Firm — Thomas F. Roland

(57) ABSTRACT

The invention relates to a method for the impregnation of continuous fibers that comprises coating said fibers with a polymer matrix containing: (a) at least one fluorinated polymer grafted with at least one carboxylic polar function and (b) optionally at least one fluorinated nongrafted polymer. The invention also relates to the composite fibers that can be obtained by said method and to the use thereof.

14 Claims, No Drawings

METHOD FOR IMPREGNATING CONTINUOUS FIBRES WITH A COMPOSITE POLYMER MATRIX CONTAINING A GRAFTED FLUORINATED POLYMER

The present invention relates to a method for impregnating continuous fibers that comprises coating said fibers with a polymer matrix comprising: (a) at least one fluorinated polymer grafted with at least one carboxylic polar function and (b) optionally at least one nongrafted fluorinated polymer. It also relates to the composite fibers that can be obtained according to this method, and also to the uses thereof.

Composite materials are the subject of intensive research since they have many functional advantages (lightness, mechanical strength, chemical resistance, scope in terms of shapes) which allow them to replace metal in very diverse applications.

Use has thus been made in recent years of composite fibers for manufacturing, in particular, various aeronautical or motor vehicle components. These composite fibers, which are characterized by good thermomechanical strengths and chemical resistance, are formed from a filamentous reinforcer that forms reinforcement, for providing the mechanical strength of the material, and from a matrix that binds and coats the reinforcing fibers, for distributing the work (flexural strength or compression strength), for conferring chemical protection on the material and for giving it its shape.

The methods for manufacturing composite components from these coated fibers include various techniques such as, for example, contact molding, spray molding, lay-up molding or low-pressure molding.

One technique for producing hollow components is that known as filament winding, which consists in impregnating dry fibers with a resin and then in winding them on a mandrel formed from reinforcements and having a shape adapted to the component to be manufactured. The component obtained by winding is then heat-cured.

In the filament winding methods, use is currently made of coating compositions formed either from polymer matrices containing thermosetting polymers, or from polymer matrices containing thermoplastic polymers of the polyether ether ketone (PEEK), poly(phenylene sulfide) (PPS) or polyphenyl sulfone (PPSU) type, for example.

Thermoplastics have the advantage of being easier to thermoform and of enabling the production of composite components having a diversity of shapes. The use of these materials is, however, problematic owing to their cost. In addition, they pose working problems owing to the difficulty in melting them below 200° C., which also affects the cost of the method, since they require a relatively high composite consolidation temperature requiring a considerable energy input.

Now, it became apparent to the Applicant, after a large amount of research, that it was possible to provide a method for coating continuous fibers that is more economical than the known methods, while at the same time making it possible to obtain composite fibers having mechanical properties, and in particular a hot creep strength, suitable especially for aeronautical and motor vehicle applications, by replacing the above-mentioned thermoplastic polymers with semicrystalline thermoplastic polymers having a glass transition temperature below 100° C., mixed with nanotubes, in particular carbon nanotubes.

However, it has been observed that fluorinated polymers have problems of compatibility with the continuous fibers to which they are supposed to adhere. The interfaces between the fluorinated polymer and the continuous fibers consequently lack cohesion, thereby leading to the appearance of weak spots on the macroscopic scale when the polymer matrix is subjected to a stress. It has also been demonstrated that the presence of carbon nanotubes in the polymer matrix used as material for coating the continuous fibers negatively affects the tensile strength of the coating material at ambient temperature, when the matrix comprises a fluorinated polymer. Finally, the dispersion of the nanotubes in the fluorinated polymer is not always satisfactory, which can result in the formation of aggregates detrimental to the desired properties for the composite.

Consequently, there remains the need for an economical method for manufacturing cohesive and homogeneous composite fibers having optimal mechanical properties for use in the manufacture of components for the aeronautical, aerospace or motor vehicle industry.

The Applicant has discovered that this need can be met by using, as coating material, a fluorinated polymer grafted with at least one carboxylic polar function, optionally mixed with a nongrafted fluorinated polymer and/or with nanotubes, in particular carbon nanotubes.

The subject of the present invention is more specifically a method for impregnating continuous fibers that comprises coating said fibers with a polymer matrix comprising: (a) at least one fluorinated polymer grafted with at least one carboxylic polar function and (b) optionally at least one nongrafted fluorinated polymer.

A subject of the invention is also the composite fibers that can be obtained according to this method.

As a preamble, it is specified that, throughout this description, the expression "between" should be interpreted as including the limits mentioned.

The method according to the invention therefore relates to the impregnation of continuous fibers.

Examples of materials forming said fibers include, without limitation:
  fibers of drawn polymer, based in particular: on polyamide, such as polyamide 6 (PA-6), polyamide 11 (PA-11), polyamide 12 (PA-12), polyamide 6,6 (PA-6,6), polyamide 4,6 (PA-4,6), polyamide 6,10 (PA-6,10) or polyamide 6,12 (PA-6,12), on a polyamide/polyether block copolymer (Pebax®), on high-density polyethylene, on polypropylene or on polyester, such as the polyhydroxyalcanoates and the polymers sold by Du Pont under the trade name Hytrel®;
  carbon fibers;
  glass fibers, in particular E, R or S2 glass fibers;
  aramid (Kevlar®) fibers;
  boron fibers;
  silica fibers;
  natural fibers such as flax, hemp or sisal; and
  mixtures thereof, such as mixtures of glass, carbon and aramid fibers.

The coating composition used according to the present invention is a polymer matrix containing in particular at least one fluorinated polymer grafted with a carboxylic polar function (hereinafter denoted, for greater simplicity, "grafted fluorinated polymer").

This grafted fluorinated polymer can be obtained by grafting at least one carboxylic polar monomer, bearing, for example, at least one carboxylic acid or carboxylic anhydride function, onto a fluorinated polymer.

More specifically, this grafted fluorinated polymer may be prepared according to a method that comprises: (a) mixing, preferably in the molten state, for example by means of an extruder or of a mixer, a fluorinated polymer with a polar monomer bearing a carboxylic acid or carboxylic anhydride function, (b) optionally transforming this mixture into granules, a powder, a film or a sheet, (c) irradiating this mixture, optionally in the absence of oxygen (and, for example, in polyethylene bags) at a dose ranging from 1 to 15 Mrad of photon or electron irradiation, in order to graft the polar monomer onto the fluorinated polymer, and (d) optionally removing the residual polar monomer that has not reacted with the fluorinated polymer. A method of preparation of this type is in particular described in application EP-1 484 346.

Examples of fluorinated polymers that can be used in the manufacture of the grafted fluorinated polymer include, without limitation:

poly(vinylidene fluoride) (PVDF), preferably in a form,
copolymers of vinylidene fluoride with, for example, hexafluoropropylene (HFP), chlorotrifluoroethylene (CTFE), trifluoroethylene (VF3) and tetrafluoroethylene (TFE),
trifluoroethylene (VF3) homopolymers and copolymers,
fluoroethylene/propylene (FEP) copolymers,
copolymers of ethylene with fluoroethylene/propylene (FEP), tetrafluoroethylene (TFE), perfluoromethylvinyl ether (PMVE), chlorotrifluoroethylene (CTFE) or hexafluoropropylene (HFP), and
blends thereof.

Some of these polymers being in particular sold by the company Arkema under the name Kynar®.

According to one preferred embodiment of the invention, the fluorinated polymer used for the manufacture of the grafted fluorinated polymer is a VDF homopolymer, also denoted PVDF.

As polar monomers bearing a carboxylic function, mention may in particular be made of unsaturated monocarboxylic and dicarboxylic acids containing from 2 to 20 carbon atoms, and in particular from 4 to 10 carbon atoms, such as acrylic acid, methacrylic acid, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo(2,2,1)hept-5-ene-2,3-dicarboxylic acid, x-methylbicyclo(2,2,1)hept-5-ene-2,3-dicarboxylic acid and undecylenic acid, and also the anhydrides thereof.

The grafted fluorinated polymer can therefore be obtained from at least one of these monomers. This fluorinated polymer is preferably grafted with maleic anhydride.

The proportion by weight of the fluorinated polymer to the polar monomer that are used in the manufacture of the grafted fluorinated polymer usually ranges from 90:10 to 99.9:0.1

Such a grafted fluorinated polymer is in particular available from the company Arkema under the trade name Kynar® ADX 710, 711, 720 or 721.

The polymer matrix used according to the invention may contain, in addition to the grafted fluorinated polymer mentioned above, at least one nongrafted fluorinated polymer, which may in particular be chosen from the fluorinated polymers mentioned above.

According to one preferred embodiment of the invention, this polymer, when it is present, is a VDF homopolymer (PVDF) or a VDF/HFP copolymer preferably containing at least 50% by weight of VDF units.

The preferred nongrafted fluorinated polymers are those of a grade suitable for injection or extrusion and preferably having a viscosity ranging from 100 to 2000 Pa·s, and more preferably from 300 to 1200 Pa·s, measured at 230° C. under a shear gradient of 100 s$^{-1}$ by means of a capillary rheometer. Examples of PVDF are sold by the company Arkema under the trade names Kynar® 710, 711 and 720 (of injection grade) or Kynar® 740, 760, 50HD and 400HD (of extrusion grade). Examples of VDF/HFP copolymers are sold by the company Arkema under the trade names Kynar® 2800 and 3120-50.

The ratio by weight of the grafted fluorinated polymer to the polymer matrix may range from 5% to 100%, and is preferably between 10% and 50%.

The fluorinated polymer and the grafted fluorinated polymer may be mixed either in the powdered state, or by compounding followed by granulation and milling of the granules.

In addition to the grafted, and optionally nongrafted, fluorinated polymer(s) described above, the polymer matrix may contain at least one reinforcer, chosen in particular from: nanotubes of at least one chemical element chosen from the elements of columns IIIa, IVa and Va of the periodic table; carbon black; glass fibers, boron fibers, silica fibers, aramid fibers, drawn polymer fibers (in particular polyamide, polyolefin or polyester fibers) and/or natural fibers such as flax, hemp and/or sisal; and mixtures thereof.

Nanotubes are preferred for use in the present invention. These nanotubes may be based on carbon, boron, phosphorus and/or nitrogen (borides, nitrides, carbides, phosphides) and, for example, formed from carbon nitride, boron nitride, boron carbide, boron phosphide, phosphorus nitride or carbon boronitride. Carbon nanotubes (hereinafter CNTs) are preferred for use in the present invention.

The nanotubes that can be used according to the invention may be of the single-wall, double-wall or multiwall type. The double-wall nanotubes may in particular be prepared as described by Flahaut et al. in *Chem. Com.* (2003), 1442. The multiwall nanotubes may, for their part, be prepared as described in document WO 03/02456.

The nanotubes normally have an average diameter ranging from 0.1 to 200 nm, preferably from 0.1 to 100 nm, more preferably from 0.4 to 50 nm, and better still from 1 to 30 nm, and advantageously have a length of from 0.1 to 10 μm. Their length/diameter ratio is preferably greater than 10, and most commonly greater than 100. Their specific surface area is, for example, between 100 and 300 m$^2$/g and their apparent density may in particular be between 0.05 and 0.5 g/cm$^3$, and more preferably between 0.1 and 0.2 g/cm$^3$. The multiwall nanotubes may, for example, comprise from 5 to 15 leaflets, and more preferably from 7 to 10 leaflets.

An example of crude carbon nanotubes is in particular commercially available from the company Arkema under the trade name Graphistrength® C100.

These nanotubes may be purified and/or oxidized and/or ground and/or functionalized, before being used in the method according to the invention.

The grinding of the nanotubes may in particular be performed hot or cold, and be carried out according to known techniques implemented in devices such as ball mills, hammer mills, pug mills, knife mills, gas-jet mills or any other grinding system capable of reducing the size of the entangled mass of nanotubes. It is preferable for this grinding step to be performed using a gas-jet grinding technique, and in particular in an air-jet mill.

The crude or ground nanotubes may be purified by washing with a solution of sulfuric acid, so as to rid them of any residual inorganic and metallic impurities resulting from the method by which they were prepared. The weight ratio of nanotubes to sulfuric acid may in particular be between 1:2 and 1:3. The purification operation may, moreover, be carried out at a temperature ranging from 90 to 120° C., for example for a period of from 5 to 10 hours. This operation may advantageously be followed by steps in which the purified nanotubes are rinsed with water and dried.

The oxidation of the nanotubes is advantageously carried out by bringing the latter into contact with a solution of sodium hypochlorite containing from 0.5% to 15% by weight of NaOCl, and preferably from 1 to 10% by weight of NaOCl, for example in a weight ratio of nanotubes to sodium hypochlorite ranging from 1:0.1 to 1:1. The oxidation is advantageously carried out at a temperature below 60° C., and preferably at ambient temperature, for a period of time ranging from a few minutes to 24 hours. This oxidation operation may advantageously be followed by steps of filtration and/or centrifugation, washing and drying of the oxidized nanotubes.

The functionalization of the nanotubes can be carried out by grafting reactive units such as vinyl monomers at the surface of the nanotubes. The material making up the nanotubes is used as a radical polymerization initiator after having been subjected to heat treatment at more than 900° C., in an anhydrous medium devoid of oxygen, which is intended to remove the oxygenated groups from its surface.

It is thus possible to polymerize methyl methacrylate or hydroxyethyl methacrylate at the surface of the carbon nanotubes with a view to facilitating in particular their dispersion in PVDF or the polyamides.

In the present invention, use is preferably made of optionally ground, crude nanotubes, i.e. nanotubes which are neither oxidized nor purified nor functionalized and which have undergone no other chemical treatment.

The nanotubes may represent from 0.5% to 30%, and preferably from 0.5% to 10%, and even more preferably from 1% to 5%, of the weight of the polymer matrix.

When they are present, it is preferable for the nanotubes to be mixed with the grafted fluorinated polymer and with the nongrafted fluorinated polymer optionally present, by compounding using customary devices such as twin-screw extruders or co-kneaders. In this process, granules of polymer(s) are typically mixed in the molten state with the nanotubes.

As a variant, the nanotubes may be dispersed, by any appropriate means, in the polymer(s) which is in solution in a solvent. In this case, the dispersion may be improved, according to one advantageous embodiment of the present invention, by using particular dispersion systems or particular dispersing agents.

Thus, the method according to the invention may comprise a preliminary step of dispersing the nanotubes in the polymer matrix by means of ultrasound or of a rotor-stator system.

Such a rotor-stator system is in particular sold by the company Silverson under the trade name Silverson® L4RT. Another type of rotor-stator system is sold by the company Ika-Werke under the trade name Ultra-Turrax®.

Other rotor-stator systems are constituted of colloidal mills, deflocculating turbomixers and high-shear mixers of rotor-stator type, such as the devices sold by the company Ika-Werke or by the company Admix.

The dispersing agents may in particular be chosen from plasticizers, which may themselves be chosen from the group constituted:

of alkyl esters of phosphates, of hydroxybenzoic acid (in which the alkyl group which is preferably linear, contains from 1 to 20 carbon atoms), of lauric acid, of azelaic acid or of pelargonic acid, of phthalates, especially dialkyl or alkylaryl phthalates, in particular alkylbenzyl phthalates, the linear or branched alkyl groups containing, independently, from 1 to 12 carbon atoms, of adipates, in particular dialkyl adipates, of sebacates, especially dialkyl sebacates, and in particular dioctyl sebacate, in particular when the polymer matrix contains a fluoropolymer, of glycol benzoates or glyceryl benzoates, of dibenzyl ethers, of chloroparaffins, of propylene carbonate, of sulfonamides, in particular where the polymer matrix contains a polyamide, and especially arylsulfonamides in which the aryl group is optionally substituted with at least one alkyl group containing from 1 to 6 carbon atoms, such as benzenesulfonamides and toluenesulfonamides, which may be N-substituted or N,N-disubstituted with at least one alkyl group, which is preferably linear, containing from 1 to 20 carbon atoms, of glycols, and of mixtures thereof.

As a variant, the dispersing agent may be a copolymer comprising at least one anionic hydrophilic monomer and at least one monomer which includes at least one aromatic ring, such as the copolymers described in document FR-2 766 106, the ratio by weight of the dispersing agent to the nanotubes preferably ranging, in this case, from 0.6:1 to 1.9:1.

In another embodiment, the dispersing agent may be a vinylpyrrolidone homopolymer or copolymer, the ratio by weight of the nanotubes to the dispersing agent preferably ranging, in this case, from 0.1 to less than 2.

In yet another embodiment, the dispersion of the nanotubes in the polymer matrix may be improved by bringing said nanotubes into contact with at least one compound A which may be chosen from various polymers, monomers, plasticizers, emulsifiers, coupling agents and/or carboxylic acids, the two components (nanotubes and compound A) being mixed in the solid state, or the mixture being in pulverulent form, optionally after elimination of one or more solvents.

The polymer matrix used according to the invention may, moreover, contain at least one adjuvant chosen from plasticizers, antioxidant stabilizers, light-stabilizers, coloring agents, impact-resistant agents, antistatic agents, flame-retardant agents and lubricants, and mixtures thereof.

Preferably, the ratio by volume of the continuous fibers to the polymer matrix is greater than or equal to 50%, and preferably greater than or equal to 60%.

The coating of the fibers with the polymer matrix can be carried out according to various techniques, depending in particular on the physical form of the matrix (pulverulent or more or less liquid) and of the fibers. The fibers may be used as they are, in the form of unidirectional threads, or after a weaving step, in the form of a fabric made up of a bidirectional network of fibers. The coating of the fibers is preferably carried out according to a fluidized-bed impregnation method, in which the polymer matrix is in the powdered state. In one less preferred variant, the fibers may be coated by passing them through an impregnating bath containing the polymer matrix in the molten state. The polymer matrix then solidifies around the fibers so as to form a semi-finished product constituted of a preimpregnated tape of fibers, that can then be wound, or of a preimpregnated fabric of fibers.

These semi-finished products are then used in the manufacture of the desired composite component. Various preimpregnated fiber fabrics, of identical or different composition, may be stacked so as to form a block or a stratified material, or, as a variant, subjected to a thermoforming process. The fiber tapes may be used in a filament winding process for obtaining hollow components of virtually unlimited shape. In the latter process, the fibers are wound on a mandrel which has the shape of the component to be manufactured. In all cases, the manufacturing of the finished component comprises a step of consolidation of the polymer matrix, which is, for example, melted locally so as to create regions where the fibers are attached to one another and to interlock the fiber tapes in the filament winding process.

In another variant, it is possible to prepare a film from the polymer matrix, in particular by means of an extrusion or calendering process, said film having, for example, a thickness of approximately 100 μm, and then to place it between two fiber mats, the assembly then being hot-pressed so as to allow impregnation of the fibers and the manufacture of the composite.

The composite fibers obtained as described above are of interest in various applications, owing to their high modulus (typically greater than 50 GPa) and their great strength, which is reflected by a tensile stress at break of greater than 200 MPa at 23° C.

The subject matter of the present invention is more specifically the use of the abovementioned composite fibers for the manufacture of rocket or airplane noses, wings or cabins; reinforcements for off-shore flexible pipes; elements of motor vehicle bodywork, engine chassis or support components for motor vehicles; or else framework elements in the construction field or bridges and roads.

The invention will now be illustrated by the following nonlimiting examples.

EXAMPLES

Example 1

Method of Filament Winding Using Carbon Fibers

A VDF homopolymer (Kynar® 710 provided by Arkema) is blended with a fluorinated polymer grafted with maleic anhydride (Kynar® ADX 120 provided by Arkema), in a weight proportion of PVDF to the grafted fluorinated polymer of 75:25. Carbon nanotubes (CNTs) (Graphistrength® C100 provided by Arkema) are then added to this blend in a proportion of 2% by weight relative to the weight of the polymer blend.

A composite matrix is then obtained, which is used to coat a continuous carbon fiber, in a fluidized bed, before transferring the preimpregnated fiber, via a guidance system, to a press suitable for the manufacture of a stratified composite block. The hot-pressing (temperature of approximately 180-190° C.) of the preimpregnated fabrics allows the composite to be consolidated.

The invention claimed is:

1. A method for producing cohesive and homogeneous continuous composite fibers comprising the step of coating and impregnating said fibers with a coating composition having (A) a polymer matrix consisting of 5 to 100% by weight of at least one fluorinated polymer grafted with at least one carboxylic polar function and 0 to 95% by weight of at least one nongrafted fluorinated polymer, and (B) from 1 to 5 percent by weight of the polymer matrix of at least one reinforcer selected from the group consisting of nanotubes consisting of carbon nitride, boron nitride, boron carbide, boron phosphide, phosphorus nitride or carbon boronitride, to produce cohesive and homogeneous continuous composite fibers.

2. The method as claimed in claim 1, wherein said continuous fibers are chosen from:
fibers of drawn polymer;
carbon fibers;
glass fibers;
aramid fibers;
boron fibers;
silica fibers;
natural fibers; and
mixtures thereof.

3. The method as claimed in claim 2 wherein said fibers of drawn polymer comprise polyamide 6 (PA-6), polyamide 11 (PA-11), polyamide 12 (PA-12), polyamide 6,6 (PA-6,6), polyamide 4,6 (PA-4,6), polyamide 6,10 (PA-6,10), polyamide 6,12 (PA-6,12), high-density polyethylene, polypropylene, or polyester; said glass fibers comprise E, R or S2 glass fibers; and said natural fibers are flax, hemp or sisal.

4. The method as claimed in claim 1, wherein the grafted fluorinated polymer is obtained by grafting at least one carboxylic polar monomer onto a fluorinated polymer.

5. The method as claimed in claim 4, wherein the fluorinated polymer onto which at least one polar monomer is grafted is selected from the group consisting of:
poly(vinylidene fluoride) (PVDF),
copolymers of vinylidene fluoride with: hexafluoropropylene (HFP), chlorotrifluoroethylene (CTFE), hexafluoropropylene (HFP), trifluoroethylene (VF3) and tetrafluoroethylene (TFE),
trifluoroethylene (VF3) homopolymers and copolymers,
fluoroethylene/propylene (FEP) copolymers,
copolymers of ethylene with fluoroethylene/propylene (FEP), tetrafluoroethylene (TFE), perfluoromethylvinyl ether (PMVE), chlorotrifluoroethylene (CTFE) or hexafluoropropylene (HFP), and
blends thereof.

6. The method as claimed in claim 5, wherein the fluorinated polymer onto which at least one polar monomer is grafted is a VDF homopolymer (PVDF).

7. The method as claimed in claim 4, wherein the carboxylic polar monomer is chosen from: unsaturated monocarboxylic and dicarboxylic acids containing from 2 to 20 carbon atoms, acrylic acid, methacrylic acid, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo(2,2,1)hept-5-ene-2,3-dicarboxylic acid, x-methylbicyclo(2,2,1)hept-5-ene-2,3-dicarboxylic acid and undecylenic acid, and the anhydrides thereof.

8. The method as claimed in claim 1, wherein the nongrafted fluorinated polymer is chosen, from the fluorinated polymers selected from the group consisting of:
poly(vinylidene fluoride) (PVDF),
copolymers of vinylidene fluoride with: hexafluoropropylene (HFP), chlorotrifluoroethylene (CTFE), hexafluoropropylene (HFP), trifluoroethylene (VF3) and tetrafluoroethyl ene (TEE),
trifluoroethylene (VF3) homopolymers and copolymers,
fluoroethylene/propylene (FEP) copolymers,
copolymers of ethylene with fluoroethylene/propylene (FEP), tetrafluoroethylene (TFE), perfluoromethylvinyl ether (PMVE), chlorotrifluoroethylene (CTFE) or hexafluoropropylene (HFP), and
blends thereof.

9. The method as claimed in claim 8, wherein the nongrafted fluorinated polymer is a VDF homopolymer (PVDF) or a VDF/HFP copolymer.

10. The method as claimed in claim 1, wherein the polymer matrix further comprises at least one reinforcer chosen from: carbon black; glass fibers, silica fibers, aramid fibers, drawn-polymer fibers and/or natural fibers such as flax, hemp and/or sisal, and mixtures thereof.

11. The method as claimed in claim 1, wherein the nanotubes represent from 0.5% to 30% of the weight of the polymer matrix.

12. The method as claimed in claim 1, wherein the ratio by volume of the continuous fibers to the polymer matrix is greater than or equal to 50%.

13. A composite fiber obtained according to the method as claimed in claim 1.

14. The composite fiber as claimed in claim 13 comprising rocket or airplane noses, wings or cabins; reinforcements for off-shore flexible pipes; elements of motor vehicle bodywork, engine chassis or support components for motor vehicles; or framework elements in the construction field or bridges and roads.

\* \* \* \* \*